(12) United States Patent
Wang et al.

(10) Patent No.: US 10,613,897 B1
(45) Date of Patent: Apr. 7, 2020

(54) SYSTEMS AND METHODS FOR CREATING PROGRAM-SPECIFIC EXECUTION ENVIRONMENTS

(71) Applicant: CA, INC., San Jose, CA (US)

(72) Inventors: Ernie Wang, Torrance, CA (US); Charlotte Chang, Northridge, CA (US); Haik Mesropian, Glendale, CA (US)

(73) Assignee: CA, Inc., San Jose, CA (US)

( * ) Notice: Subject to any disclaimer, the term of this patent is extended or adjusted under 35 U.S.C. 154(b) by 0 days.

(21) Appl. No.: 15/385,952

(22) Filed: Dec. 21, 2016

(51) Int. Cl.
G06F 9/44 (2018.01)
G06F 9/445 (2018.01)
G06F 9/48 (2006.01)
G06F 9/448 (2018.01)

(52) U.S. Cl.
CPC .......... G06F 9/4843 (2013.01); G06F 9/448 (2018.02)

(58) Field of Classification Search
CPC ............ G06F 9/4421; G06F 9/448; G06F 9/4843–9/4893
See application file for complete search history.

(56) References Cited

U.S. PATENT DOCUMENTS

| | | | | |
|---|---|---|---|---|
| 6,823,460 B1 * | 11/2004 | Hollander | ........... | G06F 12/1441 726/3 |
| 7,210,144 B2 * | 4/2007 | Traut | ........... | G06F 11/3466 703/23 |
| 7,343,421 B1 * | 3/2008 | Goyal | ........... | G06F 9/468 709/238 |
| 7,814,465 B2 * | 10/2010 | Liu | ........... | G06F 9/44589 717/124 |
| 8,127,316 B1 * | 2/2012 | Binotto | ........... | G06F 9/545 719/331 |
| 8,566,949 B2 * | 10/2013 | Ikeda | ........... | G06F 21/10 713/193 |
| 8,839,234 B1 * | 9/2014 | Voronkov | ........... | G06F 8/61 717/172 |
| 9,003,542 B1 * | 4/2015 | MacKay | ........... | G06F 21/50 726/26 |

(Continued)

OTHER PUBLICATIONS

Mathias Payer, Safe Loading—A Foundation for Secure Execution of Untrusted Programs, 2012, pp. 18-31. http://www.ieee-security.org/TC/SP2012/papers/4681a018.pdf (Year: 2012).*

(Continued)

*Primary Examiner* — Mongbao Nguyen
(74) *Attorney, Agent, or Firm* — FisherBroyles, LLP

(57) ABSTRACT

The disclosed computer-implemented method for creating program-specific execution environments may include (1) identifying a privileged software program to be executed on a client system in a program-specific execution environment, (2) establishing the program-specific execution environment by (a) determining that at least one process executing on the client system is not essential to operation of the privileged software program to be executed on the client system and (b) suspending execution of the non-essential process in response to identifying the non-essential process, and (3) initiating execution of the privileged software program in the program-specific execution environment. Various other methods, systems, and computer-readable media are also disclosed.

12 Claims, 6 Drawing Sheets

(56) References Cited

U.S. PATENT DOCUMENTS

| | | | | |
|---|---|---|---|---|
| 9,332,021 | B2* | 5/2016 | Chahal | G06F 21/54 |
| 9,465,652 | B1* | 10/2016 | Marr | G06F 9/4411 |
| 9,483,245 | B2* | 11/2016 | Asayag | G06F 8/68 |
| 9,804,887 | B2* | 10/2017 | Rangaraju | G06F 9/4843 |
| 9,965,618 | B1* | 5/2018 | Sharifi Mehr | G06F 21/51 |
| 10,216,540 | B2* | 2/2019 | Kuo | H04L 67/12 |
| 2004/0025158 | A1* | 2/2004 | Traut | G06F 11/3466 |
| | | | | 718/1 |
| 2004/0181793 | A1* | 9/2004 | Sakamoto | G06F 9/4812 |
| | | | | 718/102 |
| 2005/0240906 | A1* | 10/2005 | Kinderknecht | G06F 9/44521 |
| | | | | 717/136 |
| 2007/0266373 | A1* | 11/2007 | Liu | G06F 9/44589 |
| | | | | 717/126 |
| 2007/0300219 | A1* | 12/2007 | Devaux | G06F 12/1491 |
| | | | | 718/1 |
| 2008/0141380 | A1* | 6/2008 | Ikeda | G06F 21/10 |
| | | | | 726/27 |
| 2008/0155153 | A1* | 6/2008 | Yoshii | G06F 9/4812 |
| | | | | 710/262 |
| 2009/0276779 | A1* | 11/2009 | Kato | G06F 9/4843 |
| | | | | 718/102 |
| 2009/0307781 | A1* | 12/2009 | Iga | G06F 21/53 |
| | | | | 726/27 |
| 2010/0132013 | A1* | 5/2010 | van Riel | G06F 21/53 |
| | | | | 726/1 |
| 2011/0138473 | A1* | 6/2011 | Yee | G06F 9/445 |
| | | | | 726/26 |
| 2012/0233592 | A1* | 9/2012 | Gounares | G06F 8/311 |
| | | | | 717/114 |
| 2014/0033200 | A1* | 1/2014 | Tompkins | H04L 63/061 |
| | | | | 718/1 |
| 2014/0143875 | A1* | 5/2014 | Tikkanen | G06F 21/56 |
| | | | | 726/24 |
| 2014/0208303 | A1* | 7/2014 | Asayag | G06F 8/68 |
| | | | | 717/170 |
| 2015/0163248 | A1* | 6/2015 | Epstein | G06F 21/604 |
| | | | | 726/1 |
| 2015/0261952 | A1* | 9/2015 | Sliwa | G06F 21/53 |
| | | | | 718/1 |
| 2016/0048680 | A1* | 2/2016 | Lutas | G06F 21/554 |
| | | | | 726/23 |
| 2016/0162685 | A1* | 6/2016 | Feroz | G06F 21/53 |
| | | | | 726/22 |
| 2016/0188243 | A1* | 6/2016 | Dementiev | G06F 9/467 |
| | | | | 711/163 |
| 2017/0017797 | A1* | 1/2017 | Chambers | G06F 9/3885 |
| 2017/0103201 | A1* | 4/2017 | Fox | G06F 21/566 |
| 2017/0161102 | A1* | 6/2017 | Rangaraju | G06F 9/4843 |
| 2018/0150325 | A1* | 5/2018 | Kuo | G06F 9/5005 |
| 2019/0005257 | A1* | 1/2019 | Diekmann | G06F 21/31 |

OTHER PUBLICATIONS

Michael Wei, Integrity Verification and Secure Loading of Remote Binaries for Microkernel-based Runtime, 2014, pp. 544-551. https://ieeexplore.ieee.org/stamp/stamp.jsp?tp=&arnumber=7011293 (Year: 2014).*

Nimbalkar, Mobile Agent: Load Balanced Process Migration In Linux Environments, 2015, pp. 561-564. https://ieeexplore.ieee.org/stamp/stamp.jsp?tp=&arnumber=7155910 (Year: 2015).*

* cited by examiner

SYSTEMS AND METHODS FOR CREATING PROGRAM-SPECIFIC EXECUTION ENVIRONMENTS

BACKGROUND

As computing systems have become increasingly powerful, they have supported an ever-increasing number of processes executing at any given time. For example, many programs install update processes that run constantly, awaiting notification of software updates to be installed. Various services execute as background processes or daemons, waiting for service requests from programs, devices, or users. In addition to legitimate processes, various forms of malware or adware may be executing on a computing system at any given time. For example, a key logger may be watching a user's keystrokes for sensitive information like passwords or credit card numbers.

The various processes executing on a computing system at any given moment may create a number of problems. In addition to the security threats posed by malware, all these executing processes can impact system performance. Software bugs can cause other programs or the entire computing system to crash. In some cases, operations performed by one program may interfere with the operations of another program. For example, a user performing a time-sensitive task in one program may be interrupted by a program updater starting to download and install an update to another program. The instant disclosure, therefore, identifies and addresses a need for systems and methods for creating program-specific execution environments.

SUMMARY

As will be described in greater detail below, the instant disclosure describes various systems and methods for creating program-specific execution environments.

In one example, a computer-implemented method for creating program-specific execution environments may include (i) identifying a privileged software program to be executed on a client system in a program-specific execution environment, (ii) establishing the program-specific execution environment by (a) determining that one or more processes executing on the client system are not essential to operation of the privileged software program to be executed on the client system and (b) suspending execution of the non-essential process in response to identifying the non-essential process, and (iii) initiating execution of the privileged software program in the program-specific execution environment.

In some examples, suspending execution of the non-essential process may include using one or more application programming interfaces of an operating system of the client system to suspend the process. In some examples, suspending execution of the non-essential process may include intercepting an entry point of the process. In one embodiment, the computer-implemented method may further include (i) intercepting an attempt to initiate a new process not yet executing on the client system, (ii) determining that the new process is not essential to operation of the privileged software program, and (iii) in response to determining that the new process is non-essential, preventing the new process from initiating.

In one embodiment, the computer-implemented method may further include (i) identifying one or more tasks to be performed by the privileged software program, (ii) identifying a set of functions of the privileged software program essential to performing the task, and (iii) preventing the privileged software program from performing one or more functions not included in the set of essential functions. In some examples, preventing the privileged software program from performing the function not included in the set of essential functions may include preventing the privileged software program from initiating a process. In some examples, determining that the process is not essential to operation of the privileged software program may include querying a process dependency database using a unique identifier for the privileged software program and receiving, in response to querying the process dependency database, an indication that the process is not essential to operation of the privileged software program.

In one embodiment, the computer-implemented method may further include identifying one or more processes executing on the client system that perform one or more functions essential to operation of the privileged software program and one or more functions not essential to operation of the privileged software program and initiating a replacement process that performs the essential function but does not perform the non-essential function. In one embodiment, the process may include a device driver.

In one embodiment, a system for implementing the above-described method may include several modules stored in memory, such as (i) an identification module that identifies a privileged software program to be executed on a client system in a program-specific execution environment, (ii) a determination module and (iii) a control module that establish the program-specific execution environment by (a) the determination module determining that one or more processes executing on the client system are not essential to operation of the privileged software program to be executed on the client system, and (b) the control module suspending execution of the non-essential process in response to identifying the non-essential process, and (iv) an initiation module that initiates execution of the privileged software program in the program-specific execution environment. The system may also include at least one physical processor configured to execute the identification module, the determination module, the control module, and the initiation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a privileged software program to be executed on a client system in a program-specific execution environment, (ii) establish the program-specific execution environment by (a) determining that one or more processes executing on the client system are not essential to operation of the privileged software program to be executed on the client system and (b) suspending execution of the non-essential process in response to identifying the non-essential process, and (iii) initiate execution of the privileged software program in the program-specific execution environment.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification.

Together with the following description, these drawings demonstrate and explain various principles of the instant disclosure.

Figure 1:
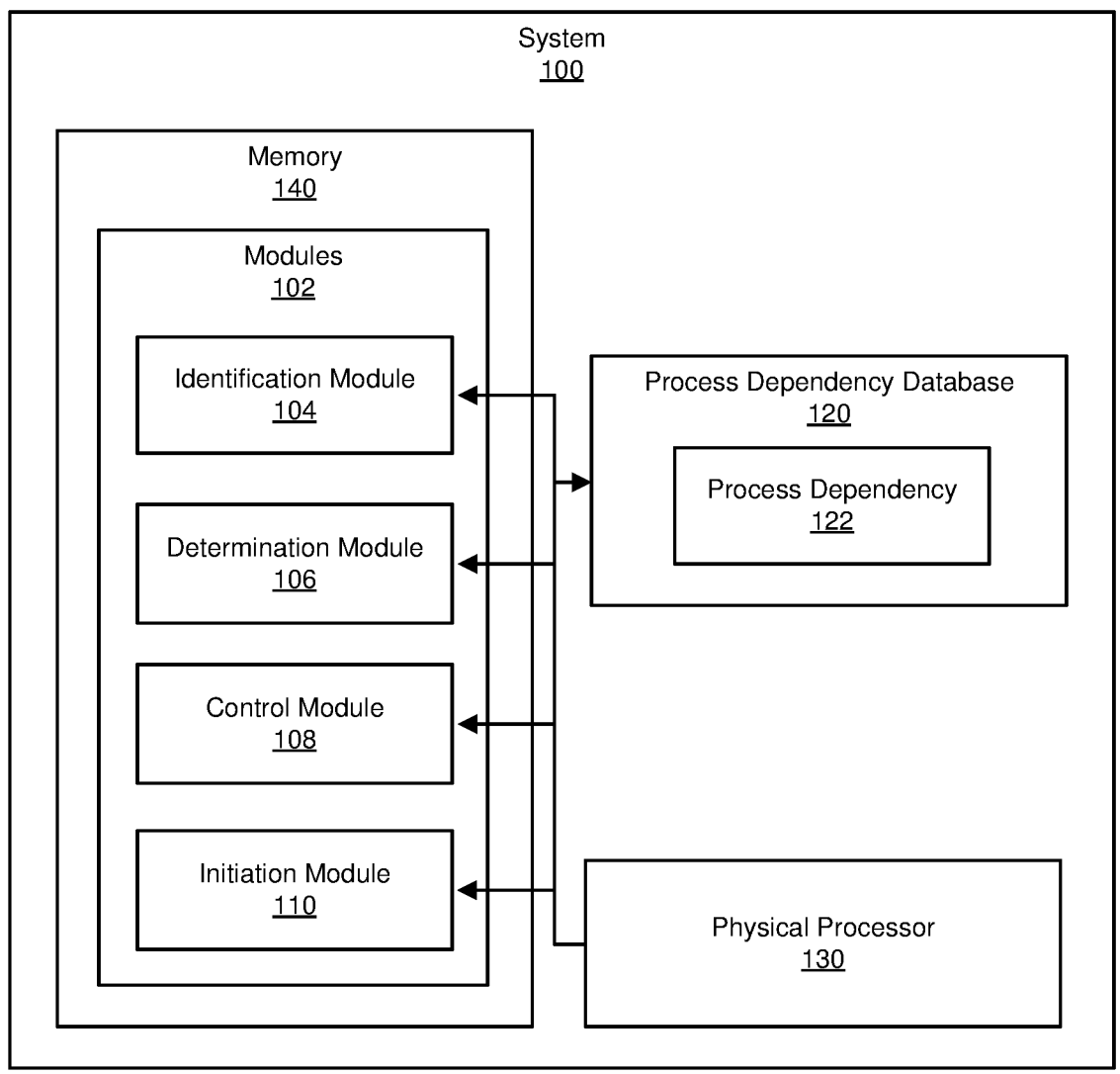
FIG. 1 is a block diagram of an example system for creating program-specific execution environments.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for creating program-specific execution environments.

As will be explained in greater detail below, by identifying and suspending non-essential processes, the systems and methods described herein may establish a program-specific execution environment that may protect a privileged software program from operational interference, security threats, software bugs, and/or performance degradation caused by other programs or processes. The systems and methods described herein may also restrict the functionality of the privileged software program to functions essential to performing a particular task, which may improve the performance and/or security of the privileged software program while performing the task. By establishing a program-specific execution environment in this way, the systems and methods described herein may improve the security and/or performance of privileged software programs, when compared to conventional execution environments.

In addition, the systems and methods described herein may improve the functioning of a computing device by improving the security and/or performance of a privileged software program, and thereby improve overall information security and system responsiveness to user needs. These systems and methods may also improve the field of computing system performance and security by providing a method for securely executing a privileged software program.

Figure 2:
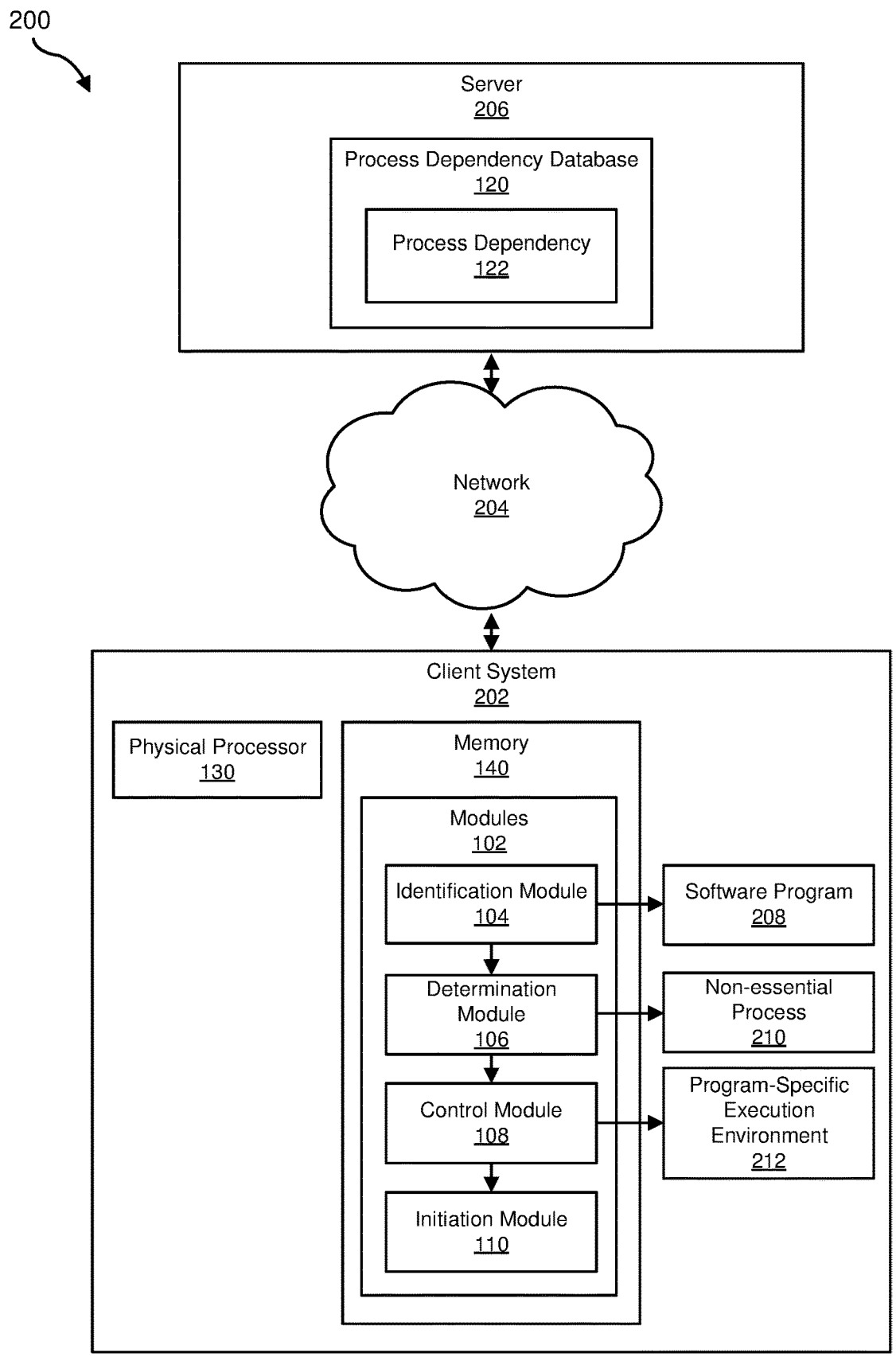
FIG. 2 is a block diagram of an additional example system for creating program-specific execution environments.
Figure 3:
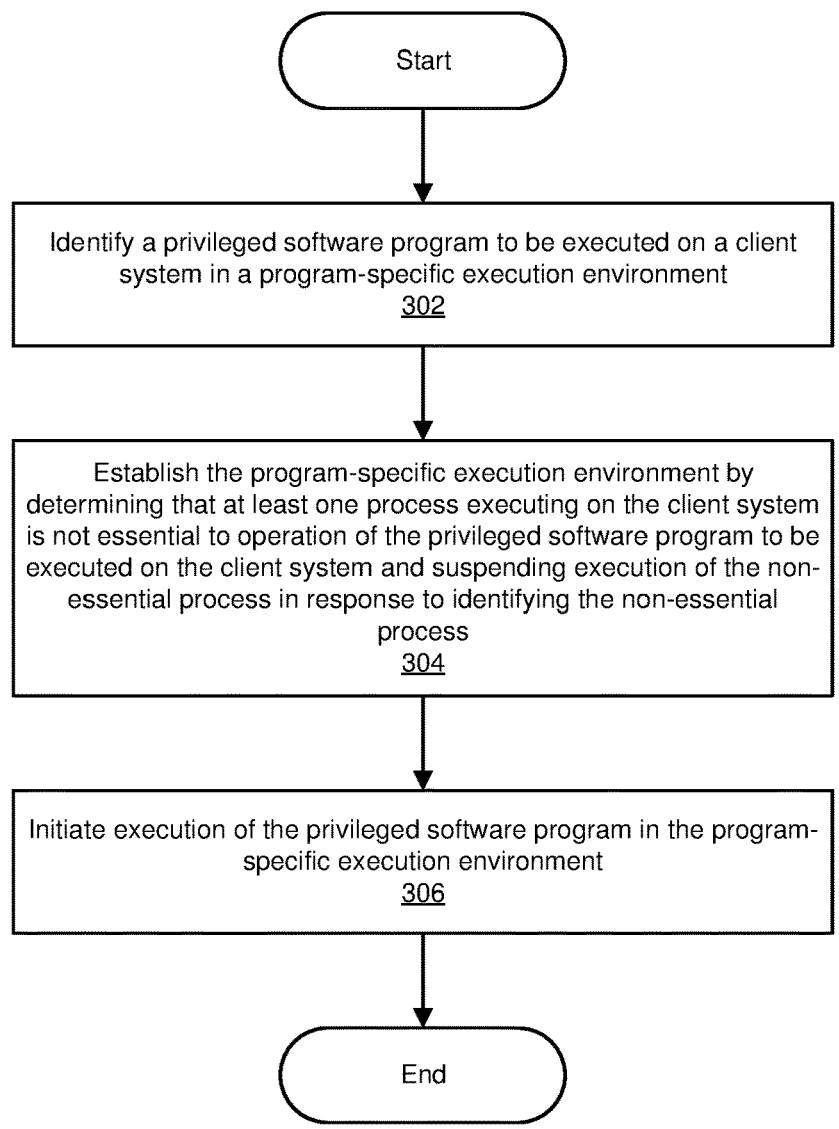
FIG. 3 is a flow diagram of an example method for creating program-specific execution environments.
Figure 4:
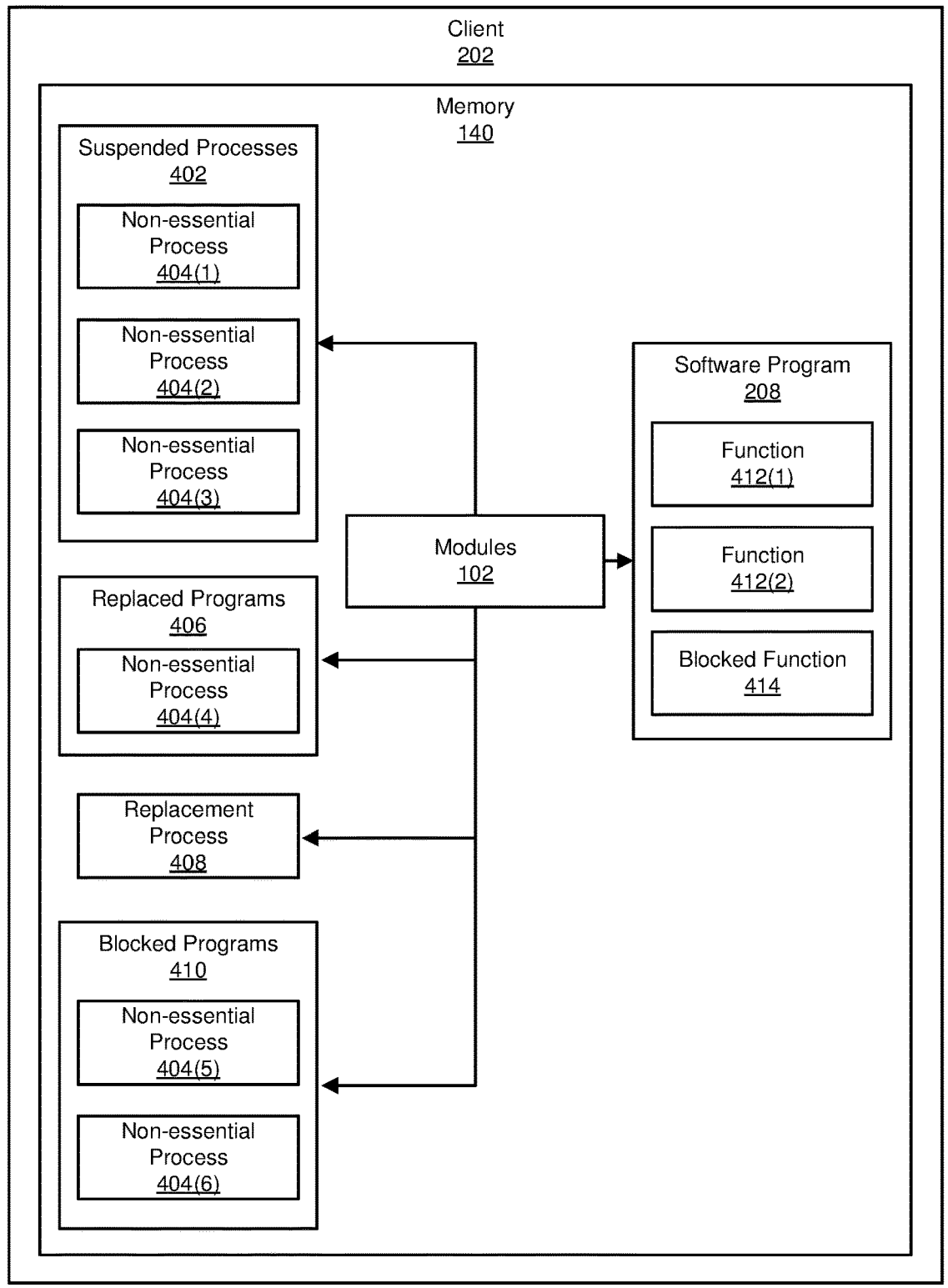
FIG. 4 is a block diagram of an example computing system for creating program-specific execution environments.

The following will provide, with reference to FIGS. 1, 2, and 4 detailed descriptions of example systems for creating program-specific execution environments. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 5 and 6, respectively.

FIG. 1 is a block diagram of example system 100 for creating program-specific execution environments. As illustrated in this figure, example system 100 may include one or more modules 102 for performing one or more tasks. For example, and as will be explained in greater detail below, example system 100 may include an identification module 104 that identifies a privileged software program to be executed on a client system in a program-specific execution environment. Example system 100 may additionally include a determination module 106 and a control module 108 that establish the program-specific execution environment by the determination module 106 determining that one or more processes executing on the client system are not essential to operation of the privileged software program to be executed on the client system, and the control module 108 suspending execution of the non-essential process in response to identifying the non-essential process. Example system 100 may also include an initiation module 110 that initiates execution of the privileged software program in the program-specific execution environment. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., client system 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate creating program-specific execution environments. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more databases, such as process dependency database 120. In one example, process dependency database 120 may be configured to store dependencies between software programs and/or between software programs and operating system processes. Process dependency database 120 may represent portions of a single database or computing device or a plurality of databases or computing devices. For example, process dependency database 120 may represent a portion of server 206 in FIG. 2, computing system 510 in FIG. 5, and/or portions of example network architecture 600 in FIG. 6. Alternatively, process dependency database 120 may represent one or more physically separate devices capable of being accessed by a computing device, such as server 206 in FIG. 2, computing system 510 in FIG. 5, and/or portions of example network architecture 600 in FIG. 6.

Example system 100 in FIG. 1 may be implemented in a variety of ways. For example, all or a portion of example system 100 may represent portions of example system 200 in FIG. 2. As shown in FIG. 2, system 200 may include a client system 202 in communication with a server 206 via a network 204. In one example, all or a portion of the functionality of modules 102 may be performed by client system 202, server 206, and/or any other suitable computing system. As will be described in greater detail below, one or more of modules 102 from FIG. 1 may, when executed by at least one processor of client system 202 and/or server 206, enable client system 202 and/or server 206 to create program-specific execution environments. For example, and as will be described in greater detail below, one or more of modules 102 may cause client system 202 and/or server 206 to create a program-specific execution environment 212 on client system 202 for the execution of software program 208. For example, and as will be described in greater detail below, identification module 104 may identify privileged software program 208 to be executed on client system 202 in program-specific execution environment 212. Determination module 106 and control module 108 may establish program-specific execution environment 212. To do so, determination module 106 may determine that at least one process executing on client system 202 (e.g., a non-essential process 210) is not essential to operation of a software program 208 to be executed on client system 202. Control module 108 may suspend execution of non-essential process 210 in response to identifying non-essential process 210. Initiation module 110 may initiate execution of software program 208 in program-specific execution environment 212.

Client system 202 generally represents any type or form of computing device capable of reading computer-executable instructions. For example, client system 202 may be an endpoint device running client-side security software. Additional examples of client system 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Server 206 generally represents any type or form of computing device that is capable of receiving, comparing, storing, and transmitting data. In one embodiment, server 206 may represent a backend server configured to store process dependencies, such as dependencies between software programs and/or between software programs and operating system processes. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between client system 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

FIG. 3 is a flow diagram of an example computer-implemented method 300 for creating program-specific execution environments. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a privileged software program to be executed on a client system in a program-specific execution environment. For example, identification module 104 may, as part of client system 202 in FIG. 2, identify privileged software program 208 to be executed on client system 202 in program-specific execution environment 212.

The phrase "privileged software program," as used herein, generally refers to a software program that merits protection from interference by other software programs or processes. A software program may, for example, be designated as privileged by a user or administrator for reasons of security, performance, or operational priority. A user may, for example, designate a game program as privileged to prevent the game from being interrupted by messaging systems or update programs. In another example, a user may designate any of several browser-based banking programs as privileged to protect the programs from malware. In some examples, one or more of the systems described herein may designate a software program as privileged. For example, one or more of the systems described herein may designate a software program as privileged by observing a performance, stability, operational, and/or security failure with the software program and remedying the failure (e.g., in subsequent executions of the software program) by designating the software program as privileged.

In some examples, a software vendor, an operating system vendor, and/or a security vendor may designate a software program as privileged based on data relating to the software program. For example, a security vendor may designate a software program as privileged based on determining that the software program has a vulnerability, processes sensitive operations and/or data, and/or is disproportionately targeted by malicious attacks. Similarly, a software vendor and/or an operating system vendor may designate a software program as privileged based on statistics of adverse performance, stability, and/or operational issues observed in the software program (e.g., across various computing systems). In some examples, a vendor may designate a software program as privileged only for a class of computing systems (e.g., those computing systems on which the software program is known and/or predicted to encounter adverse performance, stability, operational, and/or security issues at a rate above a predetermined threshold).

The term "program-specific execution environment," as used herein, generally refers to a computing environment that includes a restricted set of executing programs and/or processes necessary to execute a specific software program. For example, creating a program-specific execution environment for a gaming program may involve suspending programs or processes that may interfere with the game's display mode or degrade the performance of the client system. If the game does not require access to a printer, creating the program-specific execution environment may involve suspending a background printing process or disabling a printer driver. In some examples, a program-specific execution environment may be configured to support only a subset of a specific program's features such that the execution environment may be tailored to accomplishing a specific task. For example, a program-specific execution environment for an organization's accounting program may prevent access to networks other than the organization's virtual private network or to file systems other than a secure server, to ensure that sensitive financial information is not maliciously or inadvertently transmitted to an unauthorized recipient.

Identification module 104 may identify a privileged software program in any of a variety of ways. For example, identification module 104 may determine a software program's privilege status by accessing a software policy file or database, which may be local to the client system or stored on a server. The software policy may be established by a user or administrator. In some examples, identification module 104 may receive the privilege status of the software policy as input from the user or administrator. In another example, a software publisher may provide a utility program for creating a program-specific execution environment or include creation of a program-specific execution environment as an option of the software program. In this example, the utility program or the software program itself may identify the privilege status of the software program.

At step 304, one or more of the systems described herein may establish the program-specific execution environment by determining that one or more processes executing on the client system are not essential to operation of the privileged software program to be executed on the client system, and, in response to identifying the non-essential process, suspending execution of the non-essential process. For example, determination module 106 may, as part of client system 202 in FIG. 2, determine that one or more processes executing on client system 202 are not essential to operation of software program 208 to be executed on client system 202.

The term "essential," as used herein, generally refers to membership in a restricted set of processes relied upon to support execution of a specific privileged software program on a computing device. An essential process may support execution of a privileged software program in any of a variety of ways. For example, an essential process may support execution of a privileged software program by providing one or more services and/or functions for the privileged software program. In some examples, the essential process may improve the functioning of the privileged software program in terms of performance, functionality, stability, and/or security. By extension, the set of the software components, such as processes, libraries, and drivers, needed to support execution of essential processes on the computing device may also be considered essential. Examples of essential processes may include function libraries invoked, directly or indirectly, by the privileged software program and operating system subsystems and drivers that support privileged software program functions.

The term "non-essential," as used herein, generally refers to processes and associated software components not belonging to the restricted set relied upon to support execution of the privileged software program on the computing device. Accordingly, in some examples, each process and/or software component absent from a whitelist and/or dependency structure that defines the restricted set may be regarded as "non-essential." Thus, in some examples non-essential processes may include both harmful and benign processes, and identifying a process as non-essential may not involve making a specific determination that the non-essential process would adversely affect the privileged software program. Examples of non-essential processes may include processes detrimental to operations of the privileged software program, such as malware or resource-intensive processes that may degrade performance of the privileged software program, or processes that may modify the display mode of the computing device, obscure a portion of the privileged software program display, or distract the privileged software program user, such as program updaters or messaging programs. Non-essential processes may also include processes unrelated to the privileged software program or with no known impact on operations of the privileged software program, but which are simply not needed to support execution of the privileged software program on the computing device.

Determination module 106 may determine that one or more executing processes are non-essential in a variety of ways. For example, determination module 106 may determine that the process is not essential to operation of the privileged software program by querying a process dependency database. As shown in FIG. 2, determination module 106 may query process dependency database 120 using a unique identifier for software program 208. For example, determination module 106 may perform a hash function on the executable file for software program 208 to obtain a unique identifier associated with software program 208 to be used when querying process dependency database 120. In response to querying process dependency database 120, determination module 106 may receive an indication that the process is not essential to operation of privileged software program 208.

In another example, determination module 106 may determine that one or more executing processes are non-essential based on configuration information provided by an administrator. For example, an administrator may create a list of processes and/or operating system functions software program 208 requires to operate. Determination module 106 may then determine that other executing processes are non-essential.

Also at step 304 in FIG. 3, after determining that one or more executing processes are non-essential, one or more of the systems described herein may, in response to identifying the non-essential process, suspend execution of the non-essential process. For example, control module 108 may, as part of client system 202 in FIG. 2, in response to identifying non-essential process 210, suspend execution of non-essential process 210. Once non-essential processes have been identified and suspended, the systems described herein have established program-specific execution environment 212.

Control module 108 may suspend execution of non-essential process 210 in a variety of ways. For example, control module 108 use an application programming interface (API) of the client system's operating system to suspend the process. MICROSOFT WINDOWS provides several APIs that suspend and resume execution of a process, such as DebugActiveProcess and DebugActiveProcessStop. A program running on LINUX may issue SIGINT and SIGCONT signals to suspend and resume execution of a process.

In some examples, control module 108 may suspend execution of the non-essential process by intercepting an entry point of the process. Control module 108 may intercept a function or event handler at an entry point. Control module 108 may then determine whether to terminate execution or allow process execution to continue, based on the calling process, function parameters, etc. Control module 108 may use this approach to advantage with a function library that must remain in memory to make some library functions available while blocking access to other library functions.

In one embodiment, systems described herein may intercept an attempt to initiate a new process not yet executing on the client system and determine whether the new process is essential to operation of the privileged software program. For example, control module 108 may use an operating system API to be notified when a process start event initiates execution of a new process. Control module 108 may then determine whether the new process is essential or non-essential. If the process is non-essential, control module 108 may suspend or terminate execution of the process.

FIG. 4 is a block diagram of example system 400 for creating program-specific execution environments. As illustrated in this figure, example system 400 may include components of system 200 in FIG. 2, such as client system 202, memory 140, modules 102 and software program 208. Example system 400 may also include several non-essential processes, suspended using the techniques described above. For example, system 400 may include suspended processes 402, including non-essential processes 404(1)-404(3). System 400 may also include replaced programs 406, which may include non-essential process 404(4). Modules 102 may have replaced non-essential process 404(4) with replacement process 408. Example system 400 may also include blocked programs 410, which may include non-essential processes 404(5) and 404(6). After modules 102 establish the program-specific execution environment by suspending the non-essential processes 404 enumerated above, modules 102 may initiate software program 208, which may include function 412(1) and function 412(2). When initiating software program 208, modules 102 may block functions not essential to performing a particular task, such as blocked function 414. Modules 102 may maintain data structures similar to those represented by suspended processes 402, replaced programs 406, and blocked programs 410, so that modules 102 may resume execution of the suspended processes and programs when software program 208 exits.

At step 306, one or more of the systems described herein may initiate execution of the privileged software program in the program-specific execution environment. For example, initiation module 110 may, as part of client system 202 in FIG. 2, initiate execution of software program 208 in program-specific execution environment 212.

Initiation module 110 may initiate execution of software program 208 in a variety of ways. For example, initiation module 110 may inform the user that the program-specific execution environment has been established and allow the user to execute the privileged software program. Initiation module 110 may then monitor the privileged software program until termination, so that execution of processes suspended while establishing the program-specific execution environment may be resumed. In another example, initiation module 110 may launch the privileged software program programmatically using an operating system API.

In one embodiment, systems described herein may identify one or more tasks to be performed by the privileged software program and a set of software program functions essential to performing the task. For example, initiation module 110 may, as part of client system 202 in FIG. 2, identify a task to be performed by software program 208. For example, a user or administrator may specify that when a web browser is executing a browser-based banking application only browser functions that directly support the banking application may be permitted to execute. Initiation module 110 may determine the essential functions by querying process dependency database 120, or an administrator may specify the essential functions. Control module 108 may then assure that only the functions essential to performing the specified task are permitted to execute by preventing software program 208 from performing functions not included in the set of essential functions.

In some examples, control module 108 may prevent the privileged software program from performing at least one function not included in the set of essential functions by preventing the privileged software program from initiating a process. In the example of the browser-based banking application described above, control module 108 may prevent the browser from initiating additional browser sessions or opening windows not related to the banking application. In some examples, control module 108 may allow the privileged software program to fork and/or create new processes and/or threads for executing the privileged software program but may disallow the privileged software program from initiating processes that are not designated as essential processes.

In one embodiment, systems described herein may include identifying one or more processes executing on the client system that perform functions essential to operation of the privileged software program and one or more functions not essential to operation of the privileged software program. Systems described herein may then initiate a replacement process that performs the essential function but does not perform the non-essential function. For example, determination module 106 may, as part of client system 202 in FIG. 2, identify an operating system component, such as a device driver or function library that provides several functions, some of which are essential and others non-essential. Control module 108 may disable the component by blocking, bypassing, or unloading it from memory and replace the component with a replacement component that provides the same essential functions, but not the non-essential functions. The systems described herein may use this approach to temporarily replace a device driver that performs one or more non-essential or unwanted functions.

As explained above in connection with example method 300 in FIG. 3, the systems and methods described herein may establish a program-specific execution environment, or "soft safe mode" that protects a privileged software program from interruption by program updaters or security breaches by malware or adware. By suspending non-essential user- and kernel-mode components, most computing system resources may be dedicated to the privileged software program. When the privileged software program exits or a specific task is completed, the systems and methods described herein may dismantle the program-specific execution environment and restore the computing system to its prior state by resuming execution of any suspended processes.

As part of establishing and maintaining the program-specific execution environment, the systems and methods described herein may suspend non-essential user applications and/or kernel drivers. In addition, once the systems and methods described herein have established the program-specific execution environment, the disclosed systems and methods may block or suspend execution of any new applications and/or processes that begin executing. The disclosed systems and methods may also limit the functionality of the privileged software program to functions essential to performing a specific task and/or may block the software program from spawning additional processes.

Figure 5:
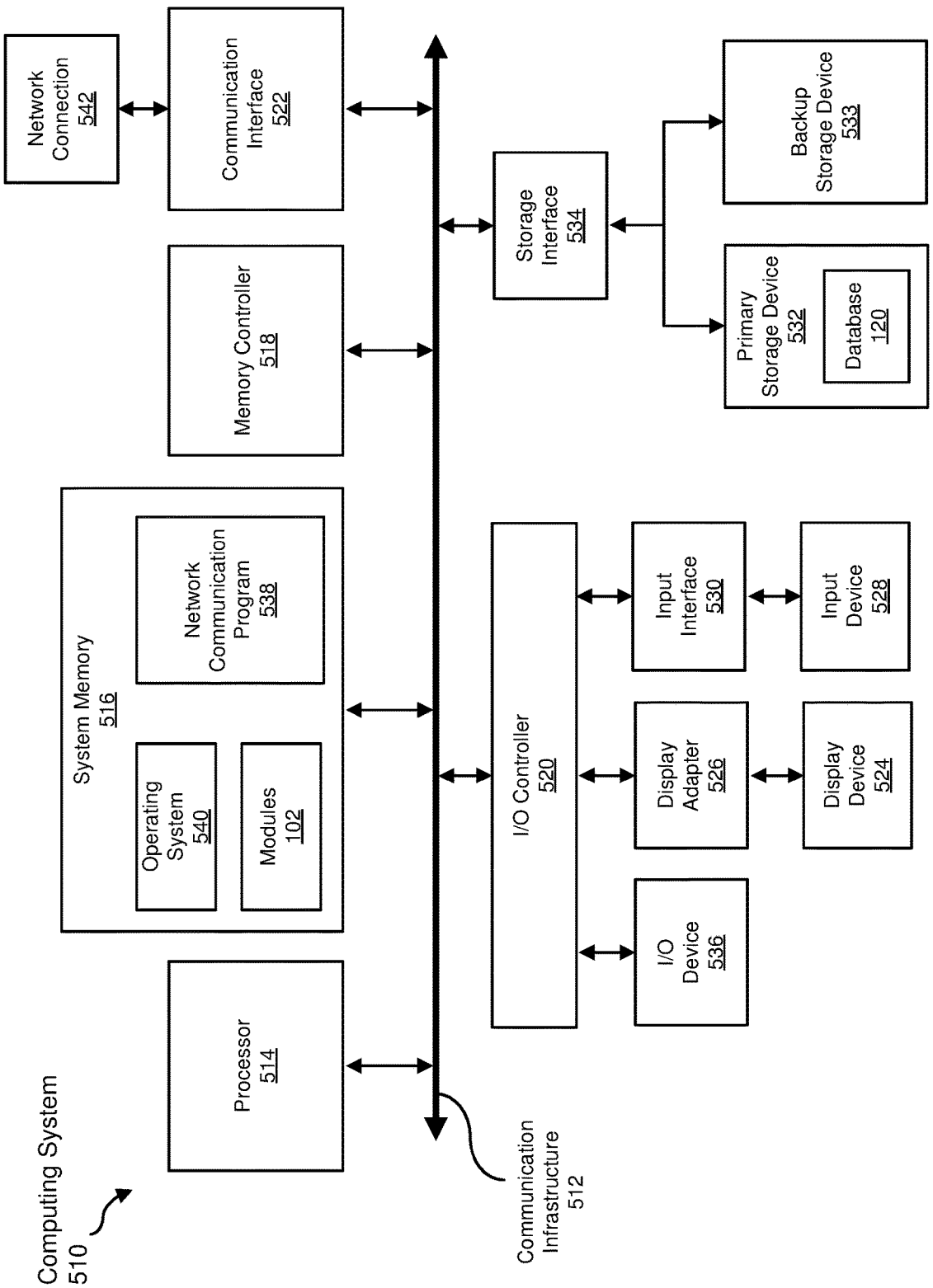
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, process dependency database 120 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
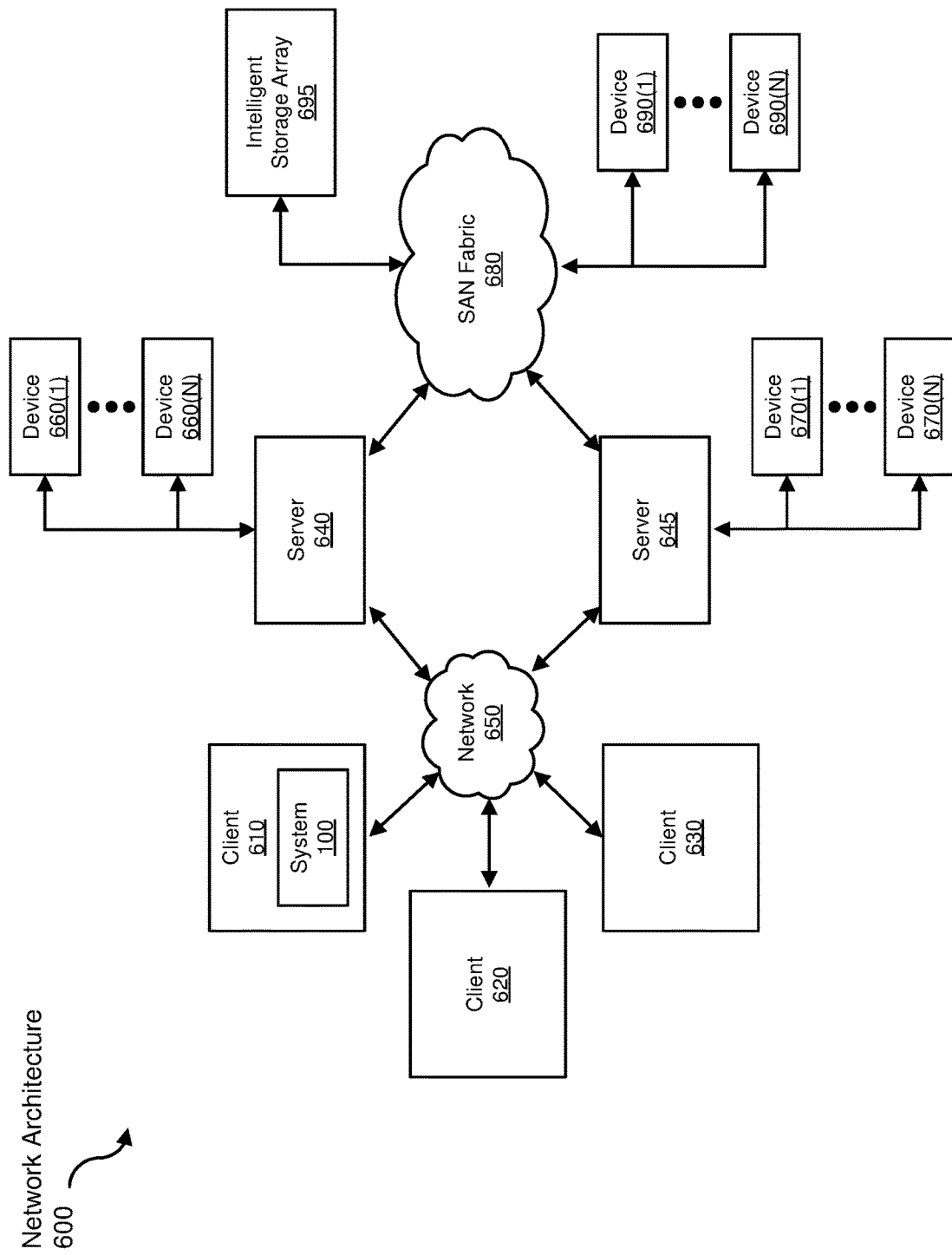
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for creating program-specific execution environments.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive process and process dependency data to be transformed, transform the data, output a result of the transformation to identify one or more non-essential processes, use the result of the transformation to create a program-specific execution environment by suspending the non-essential processes, and initiating execution of a privileged software program, and store the result of the transformation to resume execution of the suspended processes when the privileged software program terminates. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for creating program-specific execution environments, at least a portion of the method being performed by a computing device comprising at least one processor, the method comprising:
   identifying a privileged software program to be executed on a client system in a program-specific execution environment;
   establishing the program-specific execution environment by:
      determining that at least one process currently executing on the client system is not essential to operation of the privileged software program to be executed on the client system, wherein determining that the process is not essential to operation of the privileged software further comprises:
  querying a process dependency database using a unique identifier for the privileged software program; and
  receiving, in response to querying the process dependency database, an indication that the process is not essential to operation of the privileged software program;
suspending execution of the non-essential process in response to identifying the non-essential process, wherein suspending execution of the non-essential process comprises intercepting an entry point of the non-essential process;
identifying at least one other process executing on the client system that performs at least one function essential to operation of the privileged software program and at least one function not essential to operation of the privileged software program;
disabling the at least one other process in response to identifying the at least one other process; and
replacing the at least one other process with at least one replacement process that performs the essential function but does not perform the non-essential function, wherein the at least one other process comprises a device driver; and
initiating, after suspending execution of the non-essential process and replacing the at least one other process, execution of the privileged software program in the program-specific execution environment.

2. The computer-implemented method of claim 1, wherein suspending execution of the non-essential process comprises using at least one application programming interface of an operating system of the client system to suspend the non-essential process.

3. The computer-implemented method of claim 1, further comprising:
  intercepting an attempt to initiate a new process not yet executing on the client system;
  determining that the new process is not essential to operation of the privileged software program; and
  in response to determining that the new process is non-essential, preventing the new process from initiating.

4. The computer-implemented method of claim 1, further comprising:
  identifying at least one task to be performed by the privileged software program;
  identifying a set of functions of the privileged software program essential to performing the task; and
  preventing the privileged software program from performing at least one function not included in the set of essential functions.

5. The computer-implemented method of claim 4, wherein preventing the privileged software program from performing at least one function not included in the set of essential functions comprises preventing the privileged software program from initiating a process.

6. A system for creating program-specific execution environments, the system comprising:
  an identification module, stored in a memory, that identifies a privileged software program to be executed on a client system in a program-specific execution environment;
  a determination module, stored in the memory, and a control module, stored in memory, that establish the program-specific execution environment by:
    the determination module determining that at least one process currently executing on the client system is not essential to operation of the privileged software program to be executed on the client system, wherein the determination module determines that the process is not essential to operation of the privileged software by:
      querying a process dependency database using a unique identifier for the privileged software program; and
      receiving, in response to querying the process dependency database, an indication that the process is not essential to operation of the privileged software program;
    the control module suspending execution of the non-essential process in response to identifying the non-essential process, wherein the control module suspends execution of the non-essential process by intercepting an entry point of the non-essential process;
    the determination module identifying at least one other process executing on the client system that performs at least one function essential to operation of the privileged software program and at least one function not essential to operation of the privileged software program;
    the control module disabling the at least one other process in response to the determination module identifying the at least one other process; and
    the control module replacing the at least one other process with at least one replacement process that performs the essential function but does not perform the non-essential function, wherein the at least one other process comprises a device driver;
  an initiation module, stored in the memory, that initiates, after the control module suspends execution of the non-essential process and replaces the at least one other process, execution of the privileged software program in the program-specific execution environment; and
  at least one physical processor configured to execute the identification module, the determination module, the control module, and the initiation module.

7. The system of claim 6, wherein the control module suspends execution of the non-essential process by using at least one application programming interface of an operating system of the client system to suspend the non-essential process.

8. The system of claim 6, wherein: the determination module:
  intercepts an attempt to initiate a new process not yet executing on the client system; and
  determines that the new process is not essential to operation of the privileged software program; and
the control module, in response to the determination module determining that the new process is non-essential, prevents the new process from initiating.

9. The system of claim 6, wherein:
the identification module:
  identifies at least one task to be performed by the privileged software program; and
  identifies a set of functions of the privileged software program essential to performing the task; and the control module prevents the privileged software program from performing at least one function not included in the set of essential functions.

10. The system of claim 9, wherein the control module prevents the privileged software program from performing the non-essential function by preventing the privileged software program from initiating a process.

11. A non-transitory computer-readable medium comprising one or more computer-readable instructions that, when executed by at least one processor of a computing device, cause the computing device to:
   identify a privileged software program to be executed on a client system in a program-specific execution environment;
   establish the program-specific execution environment by:
      determining that at least one process currently executing on the client system is not essential to operation of the privileged software program to be executed on the client system, wherein determining that the process is not essential to operation of the privileged software further comprises:
         querying a process dependency database using a unique identifier for the privileged software program; and
         receiving, in response to querying the process dependency database, an indication that the process is not essential to operation of the privileged software program;
      suspending execution of the non-essential process in response to identifying the non-essential process, wherein suspending execution of the non-essential process comprises intercepting an entry point of the non-essential process;
      identifying at least one other process executing on the client system that performs at least one function essential to operation of the privileged software program and at least one function not essential to operation of the privileged software program;
      disabling the at least one other process in response to identifying the at least one other process; and
      replacing the at least one other process with at least one replacement process that performs the essential function but does not perform the non-essential function, wherein the at least one other process comprises a device driver; and
   initiate, after suspending execution of the non-essential process, execution of the privileged software program in the program-specific execution environment.

12. The non-transitory computer-readable medium of claim 11, wherein the one or more computer-readable instructions cause the computing device to suspend execution of the non-essential process by causing the computing device to use at least one application programming interface of an operating system of the client system to suspend the non-essential process.

* * * * *